United States Patent [19]

Dagard et al.

[11] Patent Number: 4,699,755
[45] Date of Patent: Oct. 13, 1987

[54] ULTRAFILTRATION CIRCUIT FOR THE PRIMARY COOLING FLUID OF A PRESSURIZED-WATER NUCLEAR REACTOR

[75] Inventors: Philippe Dagard, Marly le Roi; Jacques Riviere, Colombes, both of France

[73] Assignee: Framatome, Courbevoie, France

[21] Appl. No.: 867,977

[22] Filed: May 29, 1986

[30] Foreign Application Priority Data

May 29, 1985 [FR] France .................................. 85 08053

[51] Int. Cl.$^4$ .......................................... G21C 19/30
[52] U.S. Cl. ..................................... 376/313; 252/631
[58] Field of Search ............... 376/313, 315; 252/626, 252/631

[56] References Cited

U.S. PATENT DOCUMENTS 3,890,233  6/1975  Gischel .......................... 376/313 X
4,124,446  11/1978  de Francisco-Sainz ............ 376/313

FOREIGN PATENT DOCUMENTS 2552419  3/1985  France .

*Primary Examiner*—John F. Terapane
*Assistant Examiner*—John S. Maples, Jr.
*Attorney, Agent, or Firm*—Pollock, Vande Sande & Priddy

[57]  ABSTRACT

Ultrafiltration circuit for the primary cooling fluid of a pressurized-water nuclear reactor, comprising a first loop (27) taken off from the discharge branch (10) of the volumetric and chemical monitoring circuit (8) and a second loop (28) taken off from the charge branch (11) of the circuit (8). Each of the loops (27, 28) incorporates an ultrafilter (30, 50). The concentrate from the ultrafilter (30) located on the first loop (27) is cooled, depressurized and conveyed into the chemical monitoring circuit (8) via a pipe (38) downstream of the main cooling and depressurizing device (12, 13) of the circuit (8). The concentrate from the ultrafilter (50) of the loop (28) is conveyed into the chemical monitoring circuit (98) via a pipe (58) upstream of the device (12, 13).

7 Claims, 1 Drawing Figure

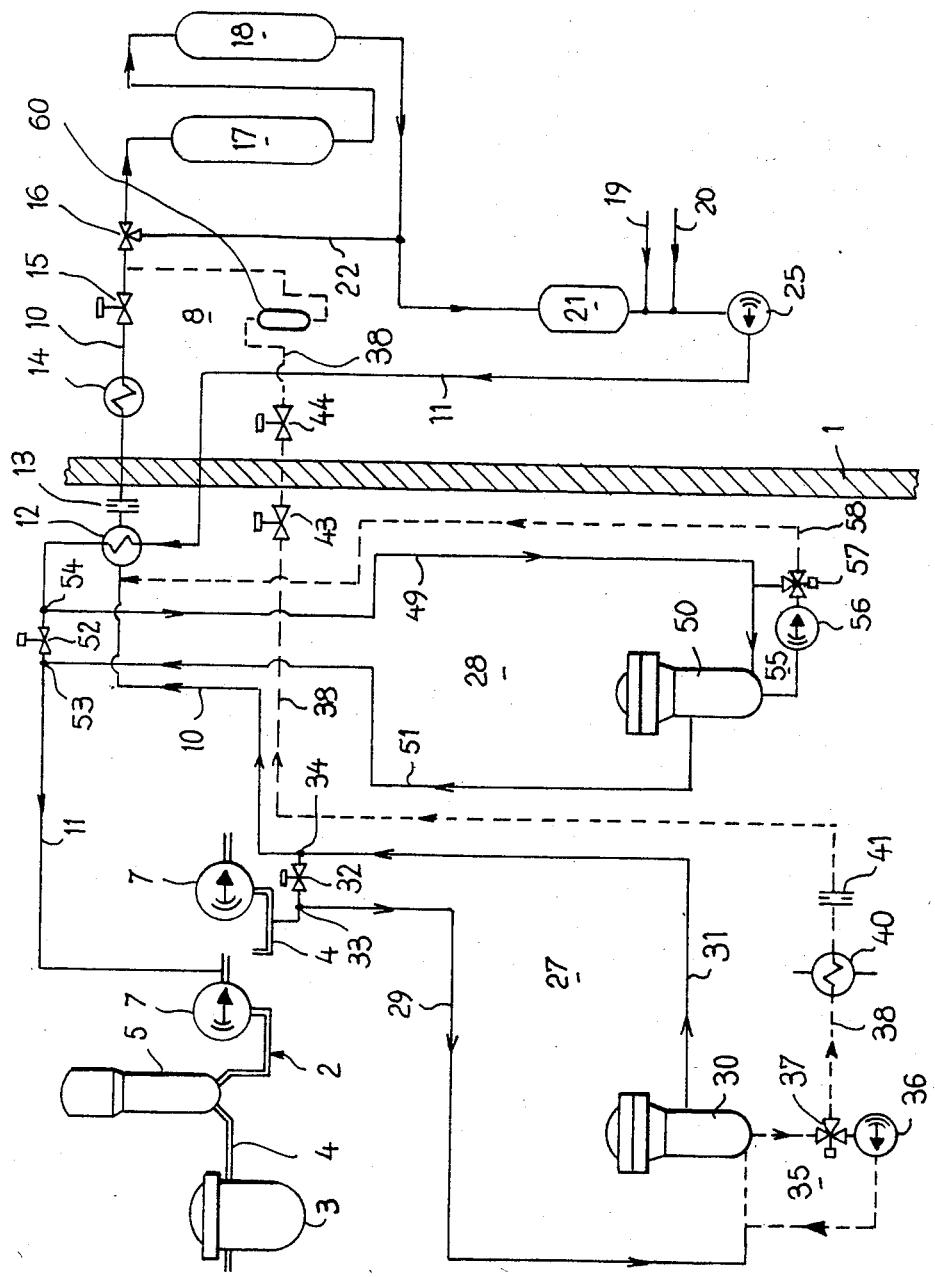

ULTRAFILTRATION CIRCUIT FOR THE PRIMARY COOLING FLUID OF A PRESSURIZED-WATER NUCLEAR REACTOR

FIELD OF THE INVENTION

The invention relates to an ultrafiltration circuit for the primary cooling fluid of a pressurized-water nuclear reactor.

Such reactors incorporate a primary circuit, in which the pressurized water cooling the fuel assemblies of the reactor core circulates. The primary circuit communicates with the inner volume of the reactor vessel containing the core and incorporates primary-fluid circulation pumps, steam generators and a pressurizer which are connected by means of large-diameter pressure-resistant pipelines. The primary circuit as a whole is located inside a containment shell constituting one of the protective structures of the nuclear reactor. Auxiliary circuits arranged either completely or partially within the containment shell are taken off from the primary circuit.

In particular, to keep the quantity and chemical quality of the primary fluid constant, a circuit called a volumetric and chemical monitoring circuit is used, and this makes it possible to sample some of the fluid circulating in the primary circuit, carry out various treatments on this primary fluid and reintroduce into the primary circuit specific quantities of fluid having precisely defined chemical characteristics. The volumetric and chemical monitoring circuit taken off from the primary circuit comprises a discharge branch and a charge branch which both pass through the wall of the containment shell to be connected, outside this containment, to various devices for purifying and treating the primary fluid. These treatments are carried out on a low-temperature and low-pressure fluid, cooling and depressurizing devices being arranged on the discharge branch of the circuit upstream of the treatment units. The primary fluid is depressurized and partially cooled before it leaves the containment shell, thus limiting the risks entailed by the presence of pressurized primary fluid outside the containment shell.

Arranged on the charge branch of the volumetric and chemical monitoring circuit are various means of injecting additives or make-up water and a charge pump, making it possible to reintroduce into the primary circuit a fluid which is at a pressure a little higher than the pressure in this circuit. The charge branch of the volumetric and chemical monitoring circuit likewise passes through the secondary side of a heat exchanger serving to cool the primary fluid sampled by means of the discharge branch.

The cooling fluid consisting of pressurized water circulates in the primary circuit at a temperature of approximately 300° C., at a pressure in the neighborhood of $155 \times 10^5$ Pa and with a flow rate of the order of 25,000 m³/h in each of the loops of the circuit. During the various operating phases of the reactor which result in increases or decreases in power, the physical or chemical parameters of the reactor have to be modified, and this is achieved particularly by means of the volumetric and chemical monitoring circuit.

During its circulation in the primary circuit or in the auxiliary circuits, the cooling fluid comes in contact with many components, most of which are made of or covered with a nickel alloy which makes it possible to limit the degree to which they are attacked by the primary fluid. However, some components, such as the seats of valves and of cocks, or even certain portions of piping experience a certain wear, with the result that the primary fluid becomes laden with particles of very small dimensions which are torn off from these components. These particles tend to circulate together with the primary fluid and therefore pass through the reactor core, where they are subjected to intense neutron bombardment, the effect of which is to activate them. In particular, wear-resistant alloys containing a certain proportion of cobalt cause highly activated particles to occur.

These particles accumulate in certain parts of the components of the reactor, and this presents problems which are very difficult to solve during the reactor maintenance operations, since these operations require preliminary decontamination phases which are very difficult to carry out.

On the other hand, the make-up water and additives introduced into the primary fluid by means of the volumetric and chemical monitoring circuit likewise contain solid particles of various origins which are activated when the primary fluid passes through the reactor core.

It is therefore necessary to treat the primary fluid periodically or continuously to reduce the content of activated or activatable particles in this primary fluid. Arranged in the volumetric and chemical monitoring circuit are units for treating the primary fluid with ion exchanger resins of the mixed-bed type, but these resins only make it possible to retain certain types of chemicals dissolved in the primary fluid, excluding particles of small dimensions transported by this fluid. Mechanical filters in the form of filter cartridges are also associated with these treatment units, but these filters do not allow particles of a size less than 5 microns to be retained, whereas the Gaussian probability curve representing the proportion of particles transported as a function of their size is centered around 0.5 microns. On the other hand, the solubility of the particles in the primary fluid is inversely proportional to the temperature, with the result that the treatment conditions in the volumetric and chemical monitoring circuit outside the containment shell are not conducive to capturing the particles effectively.

In French Patent Application No. 83-15130, in the name of the assignee of the present invention, it has been proposed to purify the primary fluid at a pressure and a temperature near its operating pressure and temperature by means of ultrafiltration using a device located inside the containment shell of the reactor, for example on the discharge branch of the volumetric and chemical monitoring circuit. The filtrate recovered at the filter outlet is subsequently cooled and depressurized, before being conveyed outside the containment shell into the treatment units of the volumetric and chemical monitoring circuit. To prevent the clogging of the ultrafiltration wall, the circulating concentrate is kept in contact with this wall during the operation of the ultrafilter. The concentrate is thus constantly laden with radioactive impurities, and the primary part of the filter has to be emptied as soon as the proportion of impurities in the concentrate becomes too high for the filter to operate under good conditions. The concentrate has to be discharged towards a liquid-waste treatment installation, thus complicating the maintenance operations in the nuclear power station. In addition to this disadvantage, there is also that associated with intermittent operation of the filter.

An additional disadvantage arises because the fluid recycled in the primary circuit via the charge branch of the volumetric and chemical monitoring circuit contains particles which come from the make-up water or additives and which are activated when they pass through the core. The quantity of active particles transported by the primary fluid consequently remains relatively large.

SUMMARY OF THE INVENTION

The object of the invention is, therefore, to propose an ultrafiltration circuit for the primary cooling fluid of a pressurized-water nuclear reactor incorporating, inside a containment shell, a primary circuit which communicates with the inner volume of the reactor vessel containing a core consisting of fuel assemblies and in which the pressurized water constituting the primary fluid circulates, and at least one auxiliary circuit taken off from the primary circuit and comprising a discharge branch, on which are arranged means of cooling and depressurizing the primary fluid sampled by means of the auxiliary circuit and which passes through the containment shell of the reactor, and a charge branch intended for returning the fluid into the primary circuit and likewise passing through the containment, and, outside the containment, means of treating the cooled and depressurized fluid, this ultrafiltration circuit making it possible to purify the primary fluid effectively both by eliminating the activated particles in the core and by eliminating non-active particles introduced via the auxiliary circuit, without increasing the quantity of radioactive waste to be treated in the power station.

To achieve this object, the ultrafiltration circuit according to the invention comprises inside the containment shell:

a first loop taken off from the discharge branch of the auxiliary circuit and incorporating a pipe for extracting and conveying fluid at its operating pressure and temperature into a first ultrafiltration device located in the first loop, a pipe for discharging filtrate at the outlet of the ultrafiltration device and for returning this filtrate into the discharge branch downstream of the point where fluid is extracted by means of the extraction pipe, a valve being inserted in the discharge branch between the two pipes, and a concentrate discharge pipe which passes through the wall of the containment and on which are arranged, inside the containment, means of cooling and depressurizing the concentrate before it is introduced into the discharge branch of the auxiliary circuit downstream of the cooling and depressurizing means located on this discharge branch, and a second loop taken off from the charge branch of the auxiliary circuit and comprising a pipe for extracting and conveying fluid at its operating temperature and pressure into a second ultrafiltration device located in the second loop, a pipe for discharging filtrate at the outlet of the ultrafiltration device and for returning this filtrate into the charge branch downstream of the extraction point, a valve being inserted between these two pipes, and a concentrate discharge pipe connected to the discharge branch of the auxiliary circuit, inside the containment, upstream of the cooling and depressurizing means arranged on this branch.

BRIEF DESCRIPTION OF THE DRAWINGS

In order that the invention may be more clearly understood, an ultrafiltration circuit according to the invention, associated with the volumetric and chemical monitoring circuit of a pressurized-water nuclear reactor, will now be described by way of example, with reference to the single attached drawing FIGURE, which illustrates diagrammatically the primary circuit, volumetric and chemical monitoring circuit and ultrafiltration circuit of a pressurized-water nuclear reactor.

The drawing shows part of the wall 1 of the containment shell of the reactor, the components located inside this containment being arranged on the left of the wall and the components located outside it being arranged on the right of the wall 1.

Arranged inside the containment shell is the primary circuit which is designated as a whole by reference numeral 2 and which comprises a vessel 3 containing the reactor core and several loops consisting of pipelines 4 communicating with the inner volume of the vessel 3. A steam generator 5 and a primary pump 7 ensuring that the primary fluid consisting of pressurized water circulates in the primary circuit are arranged on each of the loops. The drawing shows partially and in highly diagrammatic form two loops of the primary circuit, between which the volumetric and chemical circuit 8 of the nuclear reactor is connected. This volumetric and chemical circuit 8 comprises a discharge branch 10 communicating with one of the loops of the reactor and a charge branch 11 communicating with another loop of the reactor. The branches 10 and 11 of the circuit 8 both pass through the wall 1 of the containment shell, the treatment devices of the circuit 8 being arranged outside the containment. A heat-exchange device 12 and a depressurizing device 13 consisting of a nozzle incorporating an expansion orifice are arranged on the discharge branch 10 before it passes through the wall 1. The fluid circulating in the branch 10 is therefore precooled and before it passes through the wall 1 of the containment, only then entering a second heat-exchanger device 14 for the additional cooling of the fluid. The primary fluid circulating in the branch 10 is at a temperature of the order of 40° downstream of the exchanger 14. A regulating valve 15 makes it possible to regulate the flow of cooled and depressurized primary fluid, and by means of a three-way valve 16 this fluid can be directed towards different treatment units of the volumetric and chemical circuit 8. These treatment units comprise ion-exchanger columns 17 and 18 which respectively contain mixed and cationic resin beds, a borication circuit 19 and a dilution circuit 20, the respective functions of which are to introduce boric acid or demineralized water into the primary fluid. The circuit 8 also contains a tank 21 making it possible to store and regulate the primary fluid in the circuit 8. The three-way valve 16 and a branch pipe 22 make it possible, if appropriate, to short-circuit the exchange columns 17 and 18, if there is no need to carry out the corresponding treatment on the primary fluid.

Arranged on the charge branch 11 of the circuit 8 ensuring the return of the pressurised water into the primary circuit, this pipe 11 passing through the wall 1 of the containment shell, is a charge pump 25 which makes it possible to raise the pressure of the cooling water to a level higher than the operating pressure of this water in the primary circuit. Also inserted in the charge branch 11, inside the containment, is the secondary part of the heat exchanger 12 which at the same time ensures the cooling of the water in a discharge branch 10 and the heating of the water in the charge branch 11 to around the primary temperature. The pressurized high-temperature cooling water is subsequently reintroduced into the primary circuit 2.

The ultrafiltration circuit according to the invention comprises two loops 27 and 28, the first loop 27 being taken off from the discharge branch 10 of the volumetric and chemical monitoring circuit 8 and the second loop 28 being taken off from the charge branch 11 of the circuit 8. The loop 27 incorporates a pipe 29 for extracting primary water from the discharge branch 10 and for conveying this water to an ultrafiltration device 30 on one side of its untrafiltration wall consisting of an assembly of vertical tubes made of sintered metal and covered with a ceramic filtration layer, this ultrafiltration wall being inert relative to the primary fluid. This ultrafilter, can, for example, be of the type described in the above-mentioned French Patent Application No. 83-15130, or of a new type described in a patent application filed on the same day as the present application. The loop 27 also incorporates a pipe 31 for discharging the filtrate at the outlet of the ultrafilter 30 and in communication with the part of this ultrafilter located on the other side of the ultrafiltration wall in relation to the part into which the pipe 29 opens. The pipe 31 is connected to the discharge branch 10 of the circuit 8 at a point located downstream of the junction point between this branch 10 and the extraction pipe 29, if the normal direction of circulation of the fluid in the discharge branch 10 is considered. Arranged between the extraction point 33 and the point 34 where the primary fluid is returned into the discharge branch is a valve 32 which allows the fluid to pass into the ultrafiltration loop 27.

The concentrate remaining in the part of the filter located on the same side as the fluid inflow is made to circulate by means of a pump 36 in a circuit 35 incorporating part of the pipe 29 supplying the fluid to be purified. This circulation of the concentrate makes it possible to prevent clogging of the ultrafiltration wall in the filter 30. Arranged in the circuit 35 at the concentrate outlet of the filter 30 is an adjustable three-way valve 37, of which the third path constituting a link to the circuit 35 is connected to a concentrate discharge pipe 38. A heat exchanger 40 making it possible to cool the concentrate and a depressurizing device 41 are arranged on this pipe 38. The concentrate discharge pipe 38 passes through the wall 1 and opens into the branch 10 of the circuit 8 downstream of the regulating valve 15. On either side of the wall, the isolating valves 43 and 44 make it possible to isolate the pipe 38, on which a purifier 60 consisting of mixed-bed ion exchangers is arranged outside the containment.

The loop 28 of the ultrafiltration circuit incorporates a pipe 49 for extracting the primary fluid and for conveying it into an ultrafilter 50, the structure of which is identical to the structure of the filter 30 of the loop 27. The filtrate at the outlet of the ultrafilter 50 is recovered by means of a discharge and return pipe 51. The pipe 49 is connected to the charge branch 11 of the circuit 8 at an extraction point 54 and the return pipe 51 is connected to the branch 11 at a return point 53 arranged downstream of the extraction point 54, if the normal direction of circulation of the primary fluid in this charge branch 11 is considered. A valve 52 is located between the points 53 and 54 on the branch 11 and allows the fluid to pass into the ultrafiltration loop 28.

The concentrate circulates within a circuit 55 by means of a pump 56 which ensures that it passes over the ultrafiltration wall at a sufficient speed to prevent any clogging of this wall. The circuit 55 incorporates part of the primary-fluid supply pipe 49. An adjustable three-way valve 57 makes it possible to extract some of the concentrate at a branching point of the circuit 55 from a concentrate discharge pipe 58 opening into the discharge branch 10 of the volumetric and chemical monitoring circuit 8 upstream of the heat exchanger 12 and the depressurizing device 13.

The device operates as follows:

When the nuclear reactor is in operation and the cooling fluid is circulating in the primary circuit, actuation of the valve 32 causes a flow of approximately 20 $m^3/h$ to pass into the loop 27 of the ultrafiltration circuit. The extracted fluid has a pressure of the order of $155.10^5$ Pa corresponding to the pressure in the primary circuit upstream of the pump 7. The stream of primary fluid extracted passes through the ultrafilter and experiences a pressure drop of the order of $5.10^5$ Pa. A filtrate flow of the order of 19.5 $m^3/h$ is recovered at a pressure of the order of $150.10^5$ Pa. This filtrate, which has a very low concentration of particles in suspension, is reinjected into the circuit 8 at the point 34 of the discharge branch 10 where the pressure is regulated as a result of a pressure drop set at a value in the neighbourhood of $150.10^5$ Pa.

The primary fluid, from which the radioactive particles have been removed and retained in the concentrate, passes through the heat exchanger 12 and the depressurizing device 13, before flowing out of the containment to be recooled by the heat exchanger 14 and then treated in the various units of the circuit 8 which are located outside the containment. This therefore prevents radioactive particles from contaminating the high-capacity exchanger 12 and depressurizing device 13.

The adjustable three-way valve 37 is adjusted so that concentrate is drawn off continuously, in conjunction with the circulation of this concentrate in the circuit 35, via the concentrate discharge pipe 38 at a flow rate of approximately 0.5 $m^3/h$.

The discharged concentrate, which has a relatively high concentration of radioactive particles, is cooled to the ambient temperature and depressurized to atmospheric pressure by means of the exchanger 40 and the depressurizing device 41 inside the containment shell. The small stream of concentrate at low temperature and at a pressure near atmospheric pressure is mixed, after being purified in the filter 60, with the large stream of primary fluid in the discharge branch 10 of the volumetric and chemical monitoring circuit and is then conveyed into the treatment units of this circuit 8 in a highly dilute form. This avoids any contamination of the high-flow heat exchanger 12 and the depressurizing device 13 of the main discharge branch of the circuit 8, the concentrate being reinjected downstream of these elements. Contamination of the high-flow elements 12 and 13 is thus replaced by contamination of the elements of very low flow 40 and 41 on the concentrate discharge pipe.

The primary fluid deactivated and treated in the conventional way in the volumetric and chemical monitoring circuit is recompressed by means of the charge pump 25 up to a pressure of the order of $177.10^5$ Pa. After being heated to approximately 300° in the exchanger 12, this fluid is extracted at 54 via the pipe 49 of the loop 28 by means of the valve 52 at a flow rate of 20 m³/h. This stream passes through the ultrafilter 50, in which it experiences a pressure drop of $5.10^5$ Pa. The pressure of the filtrate at the outlet in the pipe 51 is therefore still much higher than the operating pressure of the primary fluid, that is to say $155.10^5$ Pa, and the primary fluid can be introduced again at 53.

The concentrate circulating in the circuit 55 is at a pressure of the order of $175.10^5$ Pa, and this concentrate discharged via the pipe 58 can easily be reintroduced into the circuit 8, of which the pressure at the reintroduction point is in the neighborhood of $145.10^5$ Pa. On the other hand, the small stream of concentrate discharged via the discharge pipe 58 in relation to the stream circulating in the discharge branch 10 allows the pressures to be equalised very easily.

The filtrate reintroduced by means of the pipe 51 into the charge branch 11 and into the primary circuit contains a very small quantity of particles, thus producing in the reactor core only a very slight reactivation of the primary fluid. The particles retained in the concentrate are non-active particles, because they come from the primary fluid which has passed through the treatment units of the volumetric and chemical monitoring circuit. These particles contained in the concentrate can therefore be reintroduced without any difficulty into the primary fluid upstream of the high-flow heat exchanger 12 and depressurizing device 13.

Under the conditions described above, the ultrafiltration efficiency is such that the content of active and non-active particles in the filtrate extracted at the outlet of the ultrafilters 30 and 50, respectively, is practically zero for particle sizes greater than 0.01 microns. This results in virtually no contamination of the high-flow exchanger 12 and depressurizing device 13 and in practically no reactivation of the primary fluid reintroduced via the volumetric and chemical monitoring circuit.

To increase the decontamination efficiency to a considerable extent, in particular of the order of 20 to 30%, it would be necessary to treat much higher flows of the order of 100 m³/h in the loop 27 or active ultrafiltration loop. For this purpose, the fluid is extracted by taking off the loop 27 from the primary circuit on either side of a primary pump 7. In this embodiment, the discharge branch of the monitoring circuit can be considered as incorporating part of the loop of the primary circuit in the vicinity of the pump 7, the active ultrafiltration pump 27 being taken off from this part of the discharge branch of the monitoring circuit.

In this case, the high-flow treatment obviously increases the flow rate of the concentrate to be discharged, this flow rate being of the order of 2.5 m³/h. However, such a flow rate can easily be accepted and treated in the volumetric and chemical monitoring circuit.

The main advantages of the ultrafiltration circuit according to the invention are that it prevents contamination of the elements of the volumetric and chemical monitoring circuit which operate with a high flow, and that it avoids reactivation of nonactive particles reintroduced via the volumetric and chemical monitoring circuit. The ultrafiltration device according to the invention thus serves both a curative function and a preventing function against the contamination of the components of the nuclear reactor.

The invention is not limited to the particular embodiment described, but embraces all the alternative forms of the latter.

Thus, ultrafilters of a type different from the ultrafilters with tubular walls, such as those described, can be used both in the active loop 27 and in the inactive loop 28. It is also possible to use regulating devices different from the valves which have been described. It is likewise possible to conceive other forms for the ultrafiltration loops and other ways of taking them off from the volumetric and chemical monitoring circuit or from another auxiliary circuit of a pressurized-water nuclear reactor.

We claim:

1. Ultrafiltration circuit for the primary cooling fluid of a pressurized-water nuclear reactor incorporating, inside a containment shell (1), a primary circuit (2) which communicates with the inner volume of the reactor vessel (3) containing a core consisting of fuel assemblies and in which the pressurized water constituting the primary fluid circulates, and at least one auxiliary circuit (8) taken off from the primary circuit (2) and comprising a discharge branch (10), on which are arranged means of cooling (12) and depressurizing (13) the primary fluid extracted by means of the auxiliary circuit (8) and which passes through the wall (1) of the containment shell, and a charge branch (11) for returning the fluid into the primary circuit (2) and likewise passing through the wall (1) of the containment, and, outside the containment, means (17, 18, 19, 20) of purifying and treating the cooled and depressurized fluid, wherein the containment shell contains (a) a first loop (27) taken off from the discharge branch (10) of the auxiliary circuit (8) and incorporating a pipe (29) for extracting and conveying fluid at its operating pressure and temperature into a first ultrafiltration device (30) located in the first loop (27), a pipe (31) for discharging filtrate at the outlet of the ultrafiltration device (30) and for returning this filtrate into the discharge branch (10) downstream of the point (33) where fluid is extracted by means of the extraction pipe (29), a valve (32) being inserted in the discharge branch (10) between the two pipes (29, 31), and a concentrate discharge pipe (39) which passes through the wall (1) of the containment and on which are arranged, inside the containment, means (40, 41) of cooling and depressurizing the concentrate before it is introduced into the discharge branch (10) of the auxiliary circuit (8) downstream of the cooling and depressurizing means (12, 13) arranged on this discharge branch (10); and (b) a second loop (28) taken off from the charge branch (11) of the auxiliary circuit (8) and incorporating a pipe (49) for extracting and conveying fluid at its operating temperature and pressure into a second ultrafiltration device (50) located in the second loop (28), a pipe (51) for discharging the filtrate at the outlet of the ultrafiltration device (50) and for returning this filtrate into the charge branch (11) downstream of the extraction point (54), a valve (52) being inserted between these two pipes (49, 51), and a concentrate discharge pipe (58) connected to the discharge branch (10) of the auxiliary circuit (8), inside the containment, upstream of the cooling and depressurizing means (12, 13) arranged on this branch (10).

2. Ultrafiltration circuit according to claim 1, wherein the discharge branch (10) of the auxiliary circuit (8) incorporates a part of the primary circuit (2) which includes a primary pump (7), and wherein the first loop (27) of the ultrafiltration circuit is taken off from the primary pump (7).

3. Ultrafiltration circuit according to claim 1, comprising a concentrate purification filter (60) arranged on the discharge pipe (38) outside the containment shell (1).

4. Ultrafiltration circuit according to claim 3, wherein the filter (60) is a filter with mixed-bed ion-exchanger resins.

5. Ultrafiltration circuit according to claim 1, wherein the concentrate retained by the ultrafiltration device (30, 50) is made to circulate by means of a circulating pump (36, 56) in a circuit (35, 55) incorporating part of the extraction and supply pipe (29, 49).

6. Ultrafiltration circuit according to claim 5, wherein the filtrate discharge pipe (38, 58) forms a link to the concentrate circulation circuit (35, 55), and a regulating device (37, 57) makes it possible to extract some of the concentrate circulating in the circuit (35, 55) via the discharge pipe (38, 58).

7. Ultrafiltration circuit according to claim 5, wherein the filtrate discharge pipe (38, 58) forms a link to the concentrate circulation circuit (35, 55), and an adjustable three-way valve makes it possible to extract some of the concentrate circulating in the circuit (35, 55) via the discharge pipe (38, 58).

* * * * *